United States Patent
Lawser et al.

[11] Patent Number: 6,157,709
[45] Date of Patent: Dec. 5, 2000

[54] METHOD AND APPARATUS FOR BRANDING DELIVERED CALLS

[75] Inventors: John Jutten Lawser, Holmdel; Steven M. Michelson, Freehold, both of N.J.

[73] Assignee: AT&T Corp., New York, N.Y.

[21] Appl. No.: 08/988,817

[22] Filed: Dec. 11, 1997

[51] Int. Cl.[7] .............................. H04M 3/42; H04M 7/00
[52] U.S. Cl. .................... 379/220; 379/207; 379/212; 379/222; 379/229
[58] Field of Search .................... 379/67.1, 88.01, 379/112, 122, 123, 127, 140, 142, 201, 220, 229, 230, 76, 88.17, 88.18, 207, 212, 114, 221, 219, 222

[56] References Cited

U.S. PATENT DOCUMENTS

| | | | |
|---|---|---|---|
| 4,899,358 | 2/1990 | Blakely | 379/67.1 |
| 4,996,704 | 2/1991 | Brunson | 379/67 |
| 5,163,083 | 11/1992 | Dowden et al. | 379/88 |
| 5,163,086 | 11/1992 | Ahearn et al. | 379/91 |
| 5,210,789 | 5/1993 | Jeffus et al. | 379/127 |
| 5,287,403 | 2/1994 | Atkins et al. | 379/144 |
| 5,475,749 | 12/1995 | Akinpelu et al. | 379/221 |
| 5,528,672 | 6/1996 | Wert | 379/96 |
| 5,535,270 | 7/1996 | Doremus et al. | 379/266 |
| 5,539,809 | 7/1996 | Mayer et al. | 379/67 |
| 5,548,636 | 8/1996 | Bannister et al. | 379/201 |
| 5,559,878 | 9/1996 | Keys et al. | 379/265 |
| 5,561,703 | 10/1996 | Arledge et al. | 379/57 |
| 5,572,577 | 11/1996 | Harrila | 379/67 |
| 5,583,920 | 12/1996 | Wheeler, Jr. | 379/88 |
| 5,600,710 | 2/1997 | Weisser, Jr. et al. | 379/67 |
| 5,652,789 | 7/1997 | Miner et al. | 379/201 |
| 5,661,792 | 8/1997 | Akinpelu et al. | 379/221 |
| 5,668,861 | 9/1997 | Watts | 379/201 |
| 5,703,935 | 12/1997 | Raissyan et al. | 379/88 |
| 5,903,639 | 5/1999 | Lipchock et al. | 379/220 |

Primary Examiner—Krista Zele
Assistant Examiner—Allan Hoosain
Attorney, Agent, or Firm—Robert B. Levy

[57] ABSTRACT

A call delivered to a called party (12, 120) is branded to identify to the called party the identity of the telecommunications carrier whose network (20) carried the call at least in part. Such branding is accomplished by triggering an announcement mechanism (34, 340) upon receipt in the network (20) of an indication that the called party has answered the call.

12 Claims, 2 Drawing Sheets

METHOD AND APPARATUS FOR BRANDING DELIVERED CALLS

TECHNICAL FIELD

This invention relates to a technique for providing to a called party the identity of the telecommunications carrier that carried the call.

BACKGROUND ART

As a result of de-regulation in the telecommunications industry, many telecommunications carriers compete with each other to provide telecommunications services, and particularly, intra-exchange and inter-exchange toll (long distance) calls. Some carriers provide an indication of their identity to the calling party during call set-up. For example, AT&T typically provides a "bong" tone as well as a message indicative of its identity to callers that selected AT&T by dialing its access code (10288), as well as callers that obtain AT&T service via a pay telephone. (Callers that have previously subscribed to AT&T as their default carrier for residential and business telephone lines currently do not receive such a message.)

Indicating the carrier identity to the calling party serves several purposes. First, the caller can confirm that his or her chosen carrier will carry the call. Secondly, identifying the carrier to the calling party enhances brand recognition of the carrier in the mind of the calling party, an especially important aspect in a competitive market place. In this way a carrier such as AT&T can differentiate itself from other carriers.

At the present time, the called party typically receives no information regarding the identity of the carrier that carried the call from the calling party, except in rare circumstances, such as a collect or third-number billed call. Traditionally, the lack of any information to the called party regarding the identity of the calling party proved inconsequential. However, as present day telecommunications service offerings become more sophisticated, affording both the calling and called party an opportunity to obtain and/or modify features during a call, a knowledge of the carrier can be important. In some instances, the opportunity of the called party to avail himself or herself of a particular feature depends whether that party has pre-subscribed to the carrier offering the feature. Unless apprised of the identity of the carrier, the called party will not know if a particular service is available. Moreover, from a marketing perspective, identifying the carrier to the called party increases brand awareness.

Thus, there is a need for a technique for providing a called party the identity of the carrier that carried the call.

BRIEF SUMMARY OF THE INVENTION

Briefly, the present invention provides a technique for presenting to a called party the identity of a telecommunications carrier delivering a call from a calling party. The method commences upon receipt of a call from the calling party at an ingress switch within a network of the telecommunications carrier carrying the call. The ingress switch may be a local switch of a Local Exchange Carrier (LEC) or a toll switch of an Inter-Exchange Carrier (IXC). From the ingress switch, the carrier routes the call through a network to an egress switch that delivers the call to the called party, either directly or through another switch. Upon answering of the call by the called party, the egress switch receives an indication that the called party answered the call. After the called party answers, the network provides to the called party a message identifying the carrier. For example, the network may provide a distinct message, either audible in the case of a conventional voice call, or either visual and/or audible in the case of a multi-media call, upon receipt of an answer message from the called party. Alternatively, the network may provide a message that starts during call set up and terminates after call answer designating the identity of the network provider.

DETAILED DESCRIPTION

Figure 1:
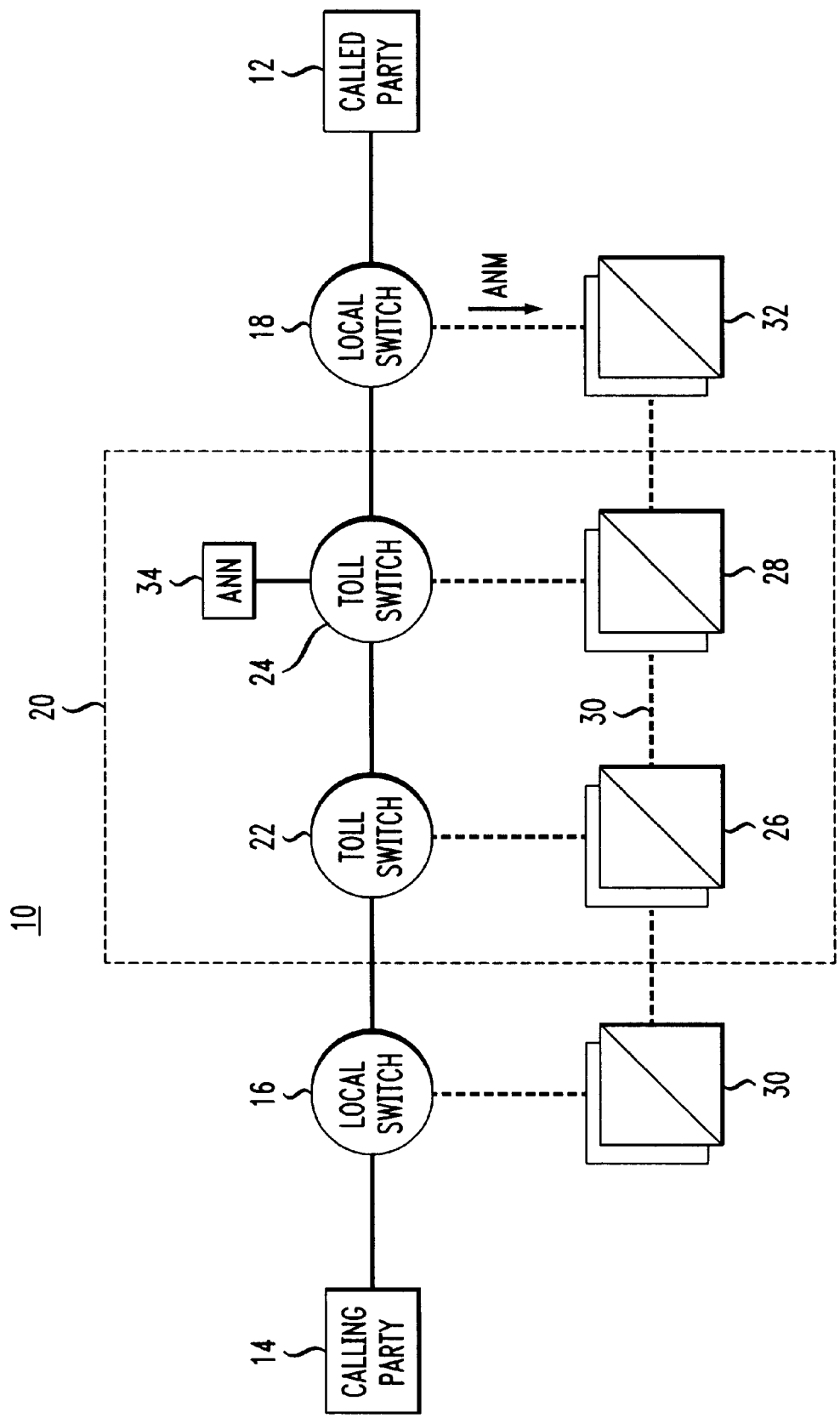
FIG. 1 shows a block diagram of a first embodiment of a telecommunications network for practicing the present invention.

FIG. 1 shows a first embodiment of a telecommunications network 10, in accordance with the invention, for branding a direct-dialed (e.g., non-operator assisted) call delivered to a called party 12 from a calling party 14 to identify the carrier that carried the call. As illustrated in FIG. 1, the calling party 14 receives telephone service (e.g., dial tone) via a first local switch 16, such as a 5ESS telephone switch manufactured by Lucent Technologies, and maintained by a Local Exchange Carrier (LEC). In a similar fashion, the called party 12 receives dial tone from a second local switch 18 maintained by a LEC the same as, or different from, the LEC that maintains the switch 16.

In practice, either or both of the called and calling parties 12 and 14, respectively, may represent conventional voice telephone sets. Alternatively, either or both of the called and/or calling parties 12 and 14 may represent ISDN terminals as are known in the art. Further, either or both of the called and calling parties 12 and 14, respectively, could represent multi-media terminals that provide multi-media service (voice, picture and/or data.).

When the called and calling parties 12 and 14, respectively, lie in different Local Access Transport Areas (LATAs), an Inter-Exchange Carrier network, such as the network maintained by AT&T, carries the call from the calling party to the called party. (Note that the calling party 14 could choose the IXC 20 to carry an Intra-Exchange toll call to the calling party rather than place such a call through the calling party's LEC.) The IXC network 20 includes a first toll switch 22 that serves the local switch 16. In terms of the IXC network 20, the switch 22 serves as an ingress switch since it receives the call from the calling party 14, via local switch 16. In the AT&T network, the toll switch 22 typically comprises a 4ESS switch manufactured by Lucent Technologies. The toll switch 22 routes a call from the calling party to a second toll switch 24 (also typically a 4ESS switch) serving the local switch 18. The toll switch 22 may route the call directly, or through one or more intermediary toll switches (not shown). Just as the toll switch 22 serves as an ingress switch, the toll switch 24 serves as an egress switch for delivering the call from the calling party 14 to the called party 12, via the local switch 18.

In addition to the toll switches 22 and 24, the IXC network 20 also includes a signaling system, such as AT&T's SS7 system, for routing control information (including call set-up messages), among the switches. The signaling system includes Signal Transfer Points (STPs) 26 and 28 associated with the toll switches 22 and 24, respectively, for routing control information across a communication path 30. The STPs 26 and 28 in the IXC network 20 are linked to STPs 30 and 32, respectively, serving the local switches 16 and 18, respectively. In this way, the local switches 16 and 18 can communicate call set-up messages with the toll switches 22 and 24, respectively.

To brand delivered calls (that is, to alert the called party 12 of the identity of the IXC network 20 that carried the call), the IXC network includes a mechanism 34 for delivering an announcement to the called party. The announcement mechanism 34 may comprises a Voice Response Unit, as is well known in the art for delivering audible call branding messages. A suitable device (not shown) could be employed to deliver visual and/or audible messages. In practice, the announcement mechanism 34 is located at either the toll switch 22 (the ingress switch) or the toll switch 24 (the egress switch) or at any intermediary switch in between. Preferably, the announcement mechanism 34 resides at the egress switch (toll switch 24 in FIG. 1) to minimize the latency delay in delivering an announcement to the called party 12.

Branding of delivered calls in accordance with the invention occurs in the following manner. The calling party 14 initiates a call to the calling party 12 by first going off hook, signaling the switch 16 to provide the calling party with dial tone. Thereafter, the calling party 14 dials the number of the called party 12. The local switch 16 receives the call, and routes the call to the toll switch 22 (assuming the dialed number is outside the serving area of the local switch). In connection with routing the call to the toll switch 22, the local switch 16 also communicates appropriate call set up messages to the toll switch 22 via the STPs 30 and 26.

The toll switch 22 routes the received call to the toll switch 24 while passing to that switch the appropriate call set-up messages via the STPs 26 and 30. Lastly, the toll switch 24 routes the call to the local switch 18, while passing to the local switch the appropriate call up messages via the STPs 28 and 32. The local switch 18 routes the call to the called party 12, and when the called party answers, then the switch delivers to the signaling system of the network 20 a message (ANSWER) via the STP 32 indicating the caller answered the call. Upon receipt of the ANSWER message, the network 20 then delivers an announcement to the called party indicative of the identity of the carrier via the announcement device 34. Depending on the nature of called party 12 (that is, the nature of equipment utilized by that party), the message may be audible, either voice, tone or music or a combination thereof, or a visual (or combination or visual and audible) message in the case of a multi-media call. Depending on the nature of the called party, the announcement message may be human-intelligible, such as an audible message delivered to a voice set, or a machine-intelligible message for receipt by a multi-media station set that, in turn translates the message into one that is intelligible by a human.

In the embodiment of FIG. 1, the ANSWER message from the STP 32 passes to the STP 28, which, in turn, signals the toll switch 24 to actuate its associated announcement mechanism 340. Should the toll switch 24 lack any announcement capability, then the ANSWER message received in the network 20 would pass to another STP associated with a switch that has announce capability. The announcement mechanism of that switch would deliver the carrier identity message to the called party 12.

Note that the ANSWER message received at the STP 32 upon answering of the call by the called party 12 may comprise a signal other than a conventional off-hook signal associated with a Plain Old Telephony Service (POTS) call. Indeed, the ANSWER message may comprise an Integrated Services User Part (ISUP) answer message associated with ISDN service or a multi-frequency signal, such as a Dual-Tone Multi-Frequency signal. The nature of the ANSWER message is not significant. In accordance with the invention, the network 10, upon receipt of the ANSWER message, whatever its form, delivers an announcement to the called party 12 indicating the identity of the carrier whose network 20 carried the call. Note that the network 10 may deliver the call-branding message upon receipt of the ANSWER message, or alternatively, may commence delivery of the message during call set up and then thereafter cease delivery some interval after call answer.

Figure 2:
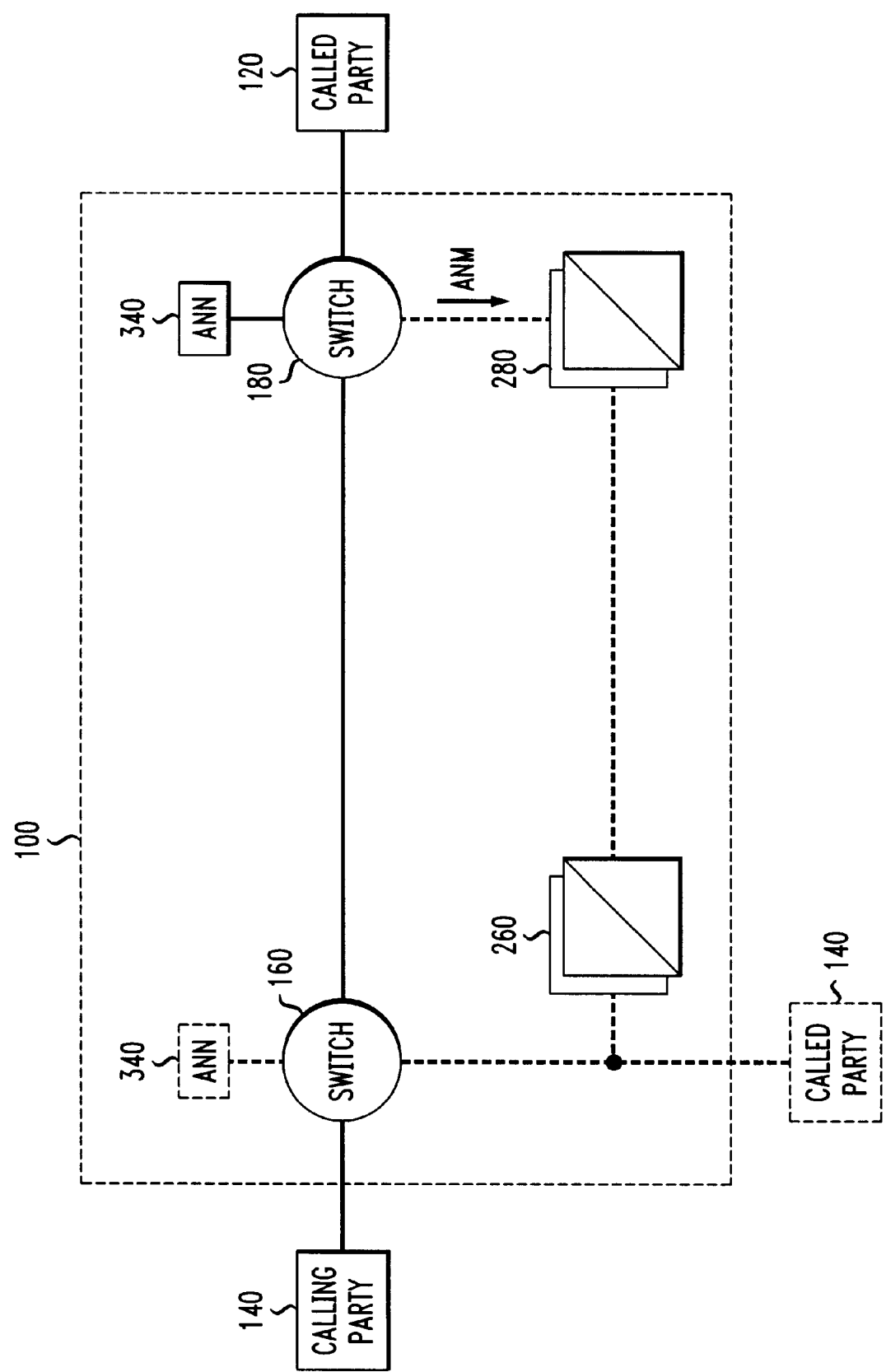
FIG. 2 shows a block schematic diagram of a second embodiment of a telecommunications network for practicing the present invention.

FIG. 2 shows a second preferred embodiment of a network 100, in accordance with the invention, for branding a delivered call to a called party 120 from a calling party 140 to identify the identity of the carrier that carried the call. The network 100 comprises a simplified version of the network 10, and includes an originating (ingress) switch 160 serving the calling party 120, and a terminating (egress) switch 180 serving the called party 120. Additional intermediary switches (not shown) may lie between the ingress and egress switches 160 and 180, respectively. The network 100 also includes a signaling system comprised of at least two STPs 260 and 280 associated with switches 160 and 180, respectively. At least one of the switches, typically switch 180, includes an announcement mechanism 340. Note that the switch 160 could also include an announcement mechanism 340 (shown in phantom).

The network 100 may take the form of a local exchange network, with the switches 160 and 180 representing local ingress and egress switches, respectively, serving calling and called parties, respectively, in the same LATA. Alternatively, the network 100 may take the from of an IXC network, such as that maintained by AT&T, with the calling and called parties 140 and 120, respectively, representing customers directly connected to the ingress and egress toll switches 160 and 180, respectively.

Like the network 10 described previously, the network 100 operates to brand a delivered call to the called party 120 by triggering an announcement mechanism 340 upon receipt of an ANSWER message received at the egress switch 180, indicating that the called party has answered the call. As discussed previously, actuating the announcement mechanism 340 that is associated with the egress switch 180 advantageously reduces latency. However, the announcement mechanism 340 associated with the ingress switch 160, or the announcement mechanism associated with an intermediary switch (not shown) could be actuated instead to deliver the carrier identity message to the called party. Like the network 10, the Network 100 could deliver the call-branding message upon receipt of the ANSWER message, or alternatively, may commence delivery of the message during call set up and then thereafter cease delivery some interval after call answer.

As depicted in FIG. 2, the present method of branding a delivered call can be practiced in connection with a single switch, say switch 160, when that switch serves both the calling and called parties 120 and 140, respectively (the latter shown in phantom). Under such circumstances, the switch 160, upon receipt by the called party 140 of an ANSWER message, would trigger the announcement mechanism 340 associated with the switch to deliver to the called party a message identifying the carrier of the call. As with the network 10, the call branding message delivered by the network 100 may be audible and/or visual, depending on the nature of the called party.

The foregoing discloses a technique for branding a delivered call to a called party to identify the carrier that carried the call.

The above-described embodiments are merely illustrative of the principles of the invention. Various modifications and changes may be made thereto by those skilled in the art which will embody the principles of the invention and fall within the spirit and scope thereof.

What is claimed is:

1. A method for presenting to a called party the identity of a telecommunications carrier carrying a non-operator assisted (direct dialed) call from a calling party to the called party, comprising the steps of:

receiving at an ingress telephone switch the direct dialed telephone call from the calling party;

routing the direct-dialed call from the ingress switch to an egress switch serving the called party without operator intervention;

receiving at the egress switch an indication when the called party has answered the direct dialed call; and providing a message to the called party receiving the direct dialed call identifying the telecommunications service provider that carried the direct dialed call to the called party.

2. The method according to claim 1 wherein the message is provided to the called party upon receipt of the indication that the called party has answered the call.

3. The method according to claim 1 wherein the routing step comprises the step of routing the call at least in part across an inter-exchange carrier network and wherein the ingress and egress switches comprise originating and terminating switches of said inter-exchange carrier network.

4. The method according to claim 1 wherein the routing step comprises the step of routing the call across a local exchange network and wherein the ingress and egress switches comprise originating and terminating switches of said local exchange network.

5. The method according to claim 1 wherein the routing step comprises the step of routing the call from the calling party via a first local exchange carrier to an inter-exchange carrier and then routing the call from the inter-exchange carrier to a second local exchange carrier and wherein the ingress and egress switches comprise originating and terminating switches of said inter-exchange carrier network.

6. The method according to claim 1 wherein the step of providing a message to the called party includes the step of triggering an announcement mechanism associated with the egress switch to deliver a message to the called party.

7. The method according to claim 1 wherein the step of providing a message to the called party includes the step of providing an audible message.

8. The method according to claim 1 wherein the step of providing a message to the called party includes the step of providing a visual message.

9. The method according to claim 1 wherein the step of receiving an indication when the called party has answered includes the step of receiving an off-hook signal from the called party.

10. The method according to claim 1 wherein the step of receiving an indication when the called party has answered includes the step of receiving an Integrated Services User Part message.

11. The method according to claim 1 wherein the step of receiving an indication when the called party has answered includes the step of receiving a multi-frequency signal.

12. A method for providing telecommunications services to a called party in accordance with the identity of a telecommunications carrier carrying a non-operator assisted (direct dialed) call from a calling party to the called party, comprising the steps of:

receiving at an ingress telephone switch the direct dialed telephone call from the calling party;

routing the direct-dialed call from the ingress switch to an egress switch serving the called party without operator intervention;

receiving at the egress switch an indication when the called party has answered the direct dialed call;

providing a message to the called party receiving the direct dialed call identifying the telecommunications service provider that carried the direct dialed call to the called party; and enabling the called party to avail itself of at least one service offered by the telecommunication service provider identified in said message.

* * * * *